US009584735B2

(12) United States Patent
Diaz et al.

(10) Patent No.: US 9,584,735 B2
(45) Date of Patent: Feb. 28, 2017

(54) FRONT AND BACK FACING CAMERAS

(75) Inventors: Raul Diaz, Palo Alto, CA (US); Hui Deng, San Ramon, CA (US)

(73) Assignee: ARCSOFT, INC., Fremont, CA (US)

( * ) Notice: Subject to any disclaimer, the term of this patent is extended or adjusted under 35 U.S.C. 154(b) by 1543 days.

(21) Appl. No.: 12/945,819

(22) Filed: Nov. 12, 2010

(65) Prior Publication Data

US 2012/0120186 A1    May 17, 2012

(51) Int. Cl.
*H04N 5/262* (2006.01)
*H04N 5/225* (2006.01)
*H04N 5/232* (2006.01)
*H04N 5/77* (2006.01)

(52) U.S. Cl.
CPC ......... *H04N 5/2624* (2013.01); *H04N 5/2258* (2013.01); *H04N 5/23229* (2013.01); *H04N 5/77* (2013.01)

(58) Field of Classification Search
None
See application file for complete search history.

(56) References Cited

U.S. PATENT DOCUMENTS

| 7,583,316 | B2 * | 9/2009 | Miyashita et al. | 348/376 |
| 7,856,181 | B2 * | 12/2010 | Maezono | 396/324 |
| 8,004,555 | B2 * | 8/2011 | Oswald et al. | 348/14.01 |
| 2002/0083323 | A1 * | 6/2002 | Cromer et al. | 713/176 |
| 2008/0031606 | A1 * | 2/2008 | Zax et al. | 396/56 |
| 2008/0125972 | A1 * | 5/2008 | Neff | 701/300 |
| 2010/0134618 | A1 * | 6/2010 | Kim et al. | 348/140 |
| 2011/0244958 | A1 * | 10/2011 | Nimura et al. | 463/31 |
| 2012/0008011 | A1 * | 1/2012 | Garcia Manchado | 348/231.2 |

* cited by examiner

*Primary Examiner* — Christopher S Kelley
*Assistant Examiner* — Asmamaw G Tarko
(74) *Attorney, Agent, or Firm* — Patent Law Group LLP; David C. Hsia

(57) ABSTRACT

Apparatus and methods related to image taking and processing are provided. For example, some embodiments may contain a front facing camera and a back facing camera and can be used for including the image-taker as part of the images taken by the image-taker, for verifying authorship of the image, for creating documentary style still or moving images combining the images of the person creating the documentary and the images of the subject or the scene being documented, and for creating a wide field of views of still and moving images.

3 Claims, 6 Drawing Sheets

FRONT AND BACK FACING CAMERAS

BACKGROUND

1. Technical Field

This document relates to apparatus and methods involved in image taking and processing.

2. Background Information

Various camera-containing apparatus, such as a digital still camera, a digital video camera, or a mobile phone equipped with a camera, are used for taking still or moving images. The images are taken by an image-taker, oftentimes a real person, with cameras facing away from the real person and toward a scene, who views the scene being taken as images from behind a viewfinder.

SUMMARY

This document discloses apparatus and methods related to image taking and processing. For example, the apparatus and methods disclosed herein can be used for including the image-taker as part of the images taken by the image-taker, for verifying authorship of the images, for creating documentary style still or moving images combining the images of the person creating the documentary and the images of the subject or the scene being documented, and for creating a wide field of views of still and moving images.

In one aspect, the apparatus and methods disclosed herein feature at least one camera facing the image-taker ("front facing camera"), and at least one camera facing a different direction than the front facing camera ("back facing camera" and together "front and back facing cameras"). The front and back facing cameras can be configured to take images at predetermined times by a controller. The images taken by the front and back facing cameras can be combined by a processor, and can be stored in a memory. There can be multiple front facing cameras, as well as multiple back facing cameras. The front and back facing cameras can be configured to obtain stereoscopic images, as well as to measure the speed of a moving object. There can be a screen for displaying the image from the front facing camera, or the back facing camera, or combined images obtained by combining the images from the front and back facing cameras, which images can further be transferred to interne, electronic device, instant film, and printer by an uploader. The interne can be a social networking website, such as YouTube, Facebook, Flickr, and Twitter. The front and back facing cameras can take images simultaneously, and the images taken simultaneously can be used for verifying the authorship of the image taken by the back facing camera. In some implementations, to verify the image-taker is a real person, the front facing cameras may perform one or more of the following: detects blink motion, performs facial recognition, take stereoscopic images, and take moving images. The processor can be configured to combine information from said images for verifying the authorship of the image taken by the back facing camera. The images taken by the front and back facing cameras can contain the same time-stamp information. The image taken by the front facing camera can be combined with the image taken by the back facing camera as one or more of the following identifying information: image, part of the data section of the back facing camera, watermark, and digital signature, to create a combined image. The front facing camera can take the images of the image-taker for documentary purposes. The images taken by the front and back facing cameras can be combined into a single stream, and the images taken by the front facing camera can be used for the purpose of creating a first-person documentary. The image-taker can control the combination of images taken by the front and back facing cameras to enable real-time inclusion and exclusion of the images taken by the front facing camera in the single stream. The images can be displayed in one or more of the following format: only image from the front facing camera, only image from the back facing camera, and image resulted from combining images taken by the front and back facing cameras. The processor can be configured to create a panoramic image based on images taken by the front and back facing cameras. Information such as a unique identifier, the date and time of the images taken by the front and back facing cameras, and the combined image or a predetermined portion thereof can be obtained, and a unique key can be created based on such information. The unique key can be encrypted to create a unique encrypted key. The unique encrypted key can be inserted into the metadata area of the combined image.

These general and specific aspects may be implemented using a system, a method, or a computer program, or any combination of systems, methods, and computer programs.

Unless otherwise defined, all technical and scientific terms used herein have the same meaning as commonly understood by one of ordinary skill in the art to which this invention pertains. Although apparatus and methods similar or equivalent to those described herein can be used in the practice or testing of the present invention, suitable apparatus and methods are described below. All publications, patent applications, patents, and other references mentioned herein are incorporated by reference in their entirety. In case of conflict, the present specification, including definitions, will control. In addition, any apparatus, materials, methods, and examples are illustrative only and not intended to be limiting.

Other aspects, features, and advantages will be apparent from the following detailed description, the drawings, and the claims.

DETAILED DESCRIPTION

This document discloses apparatus and methods related to image taking and processing. For example, this document discloses apparatus and methods related to the use of front and back facing cameras for taking and processing images. The term "front facing camera" as used herein refers to the camera facing the image-taker; the term "back facing camera" as used herein refers to the camera facing a different direction than the front facing camera; together they can be referred to as "front and back facing cameras."

Figure 3:
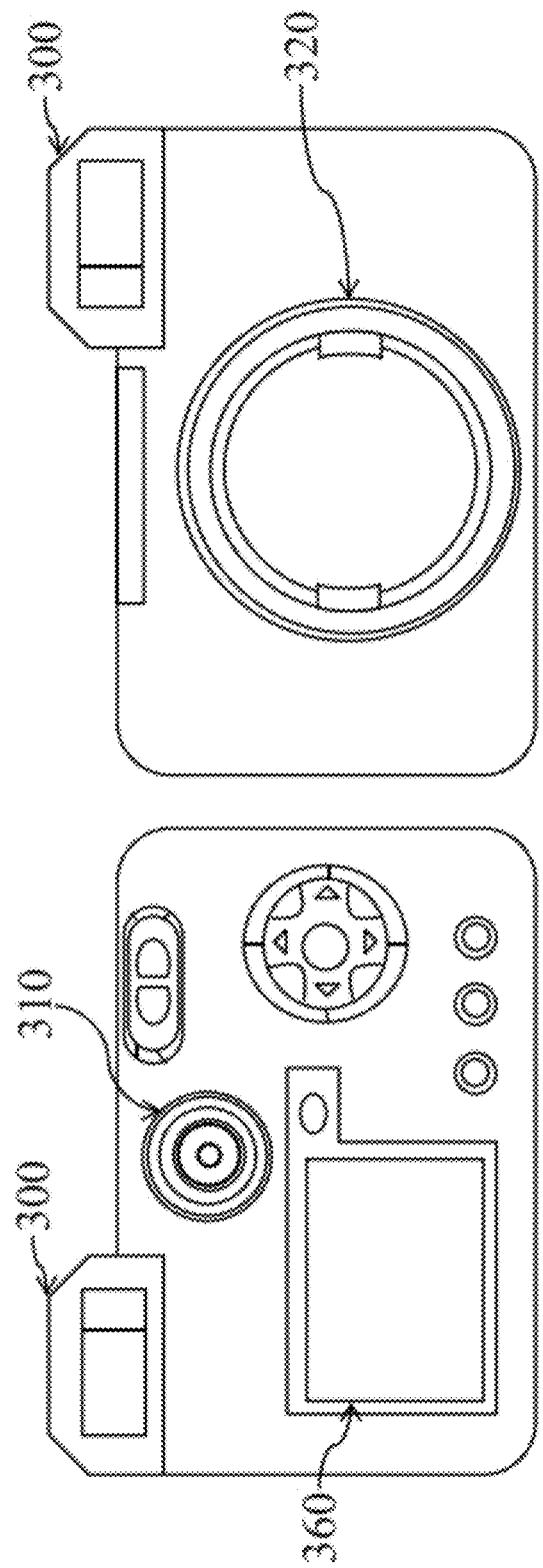
FIG. 3 is a diagram indicating a digital camera equipped with front and back facing cameras.
Figure 4:
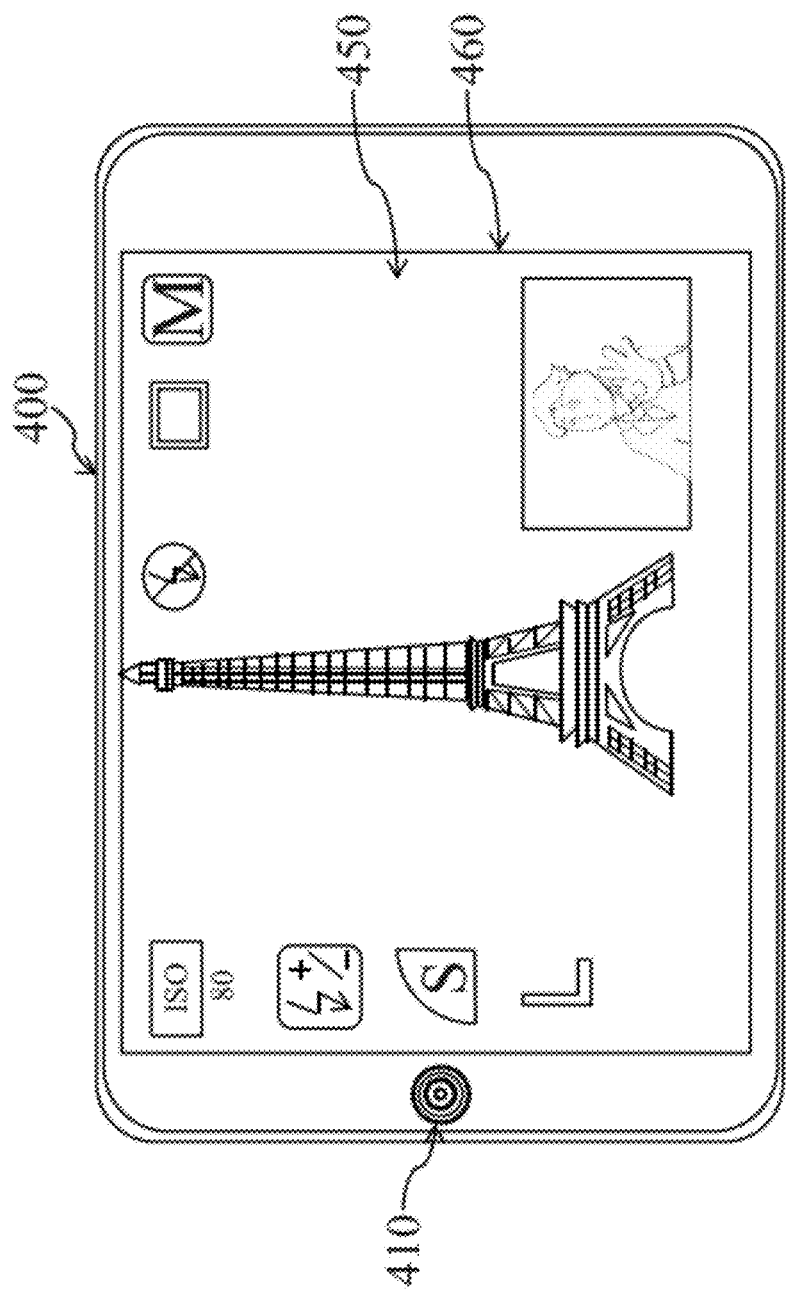
FIG. 4 is a diagram indicating a tablet computer equipped with front and back facing cameras (showing only the front facing camera).

The apparatus for taking and processing images can be, for example, a digital camera containing front and back facing cameras (FIG. 3), a mobile phone equipped with front and back facing cameras (FIG. 2), and a tablet computer equipped with front and back facing cameras (FIG. 4).

Figure 1:
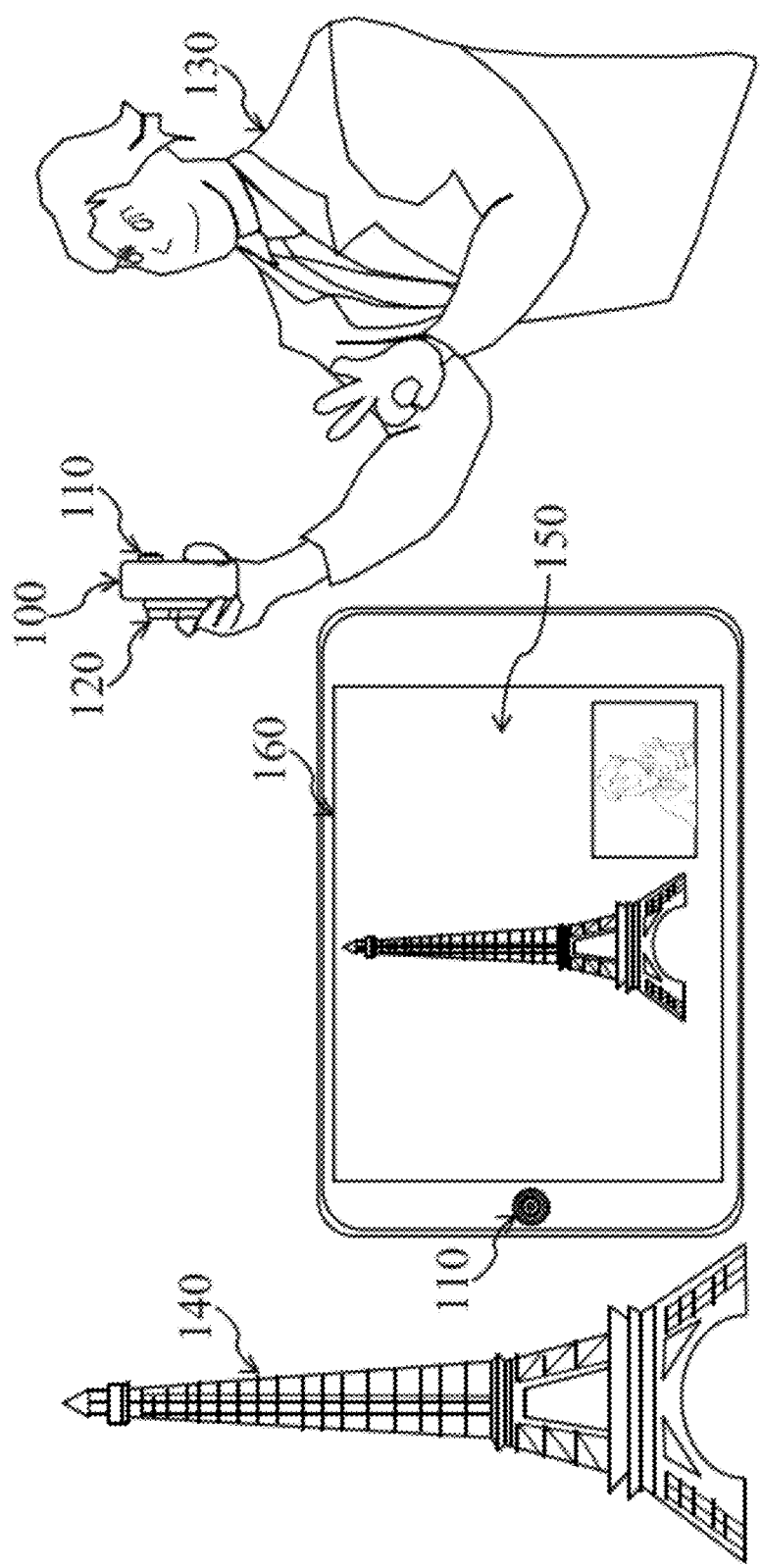
FIG. 1 is a diagram indicating images being taken and processed by front and back facing cameras.

FIG. 1 shows an implementation of the apparatus and methods related to the use of front and back facing cameras for taking and processing images. An image-taker 130 holds an apparatus 100, which has a front facing camera 110 that faces the image-taker and a back facing camera 120 that faces the scene 140. The apparatus 100 contains a controller (not shown) that can enable the front and back facing cameras to take images at predetermined times (for example, at the same time). The apparatus 100 also contains a processor (not shown) to combine images taken by the front and back facing cameras to create a combined image 150 that can be displayed on a screen 160 on the apparatus 100. The combined image 150 includes the image of the image-taker 130 (taken by the front facing camera 110) as a smaller image inside a bigger image of the scene 140 (taken by the back facing camera 120). The images taken by the front and back facing cameras, as well as the combined images generated by the processor, can be stored on a memory (not shown) on the apparatus 100.

The controller can be implemented using a combination of integrated circuit, software, and mechanical devices commonly deployed in digital cameras. For example, in a typical digital camera, pressing down the shutter button will trigger the release of the shutter and taking of an image. The same mechanism can be partially duplicated such that pressing down the shutter button will trigger the release of the shutter and taking of an image for both the front facing camera and the back facing camera. The shutter button can be a physical button, or can be enabled using a touch screen. For both the front facing camera and the back facing camera, the shutter release and taking of an image can also be controlled by a timer, and the image-taker can select the timing of the image-taking using physical buttons or a touch screen or voice control, such that the shutter release and taking of an image for the front and back facing cameras can be controlled to occur at predetermined times. They can occur either at the same time, or at different times.

In some implementations, the front and back facing cameras can be controlled to take images at the same time, and the images taken simultaneously can be used for verifying authorship of the image taken by the back facing camera. For example, the image of the author taken by the front facing camera can directly appear as a smaller image inside the image taken by the back facing camera and provide instantaneous identification of the author of the image taken by the back facing camera. As further exemplified below, more sophisticated methods, including encryption, can be deployed to take advantage of the images taken simultaneously with the front and back facing cameras to further improve the reliability of authorship verification.

The processor can be any processors capable of conducting electronic computing, such as a microprocessor. The images captured by the front and back facing cameras can be processed by the processor and subsequently displayed or saved as individual images or combined images. Where the images from the front and back facing cameras are taken simultaneously, the processor can render the same timestamp information for the images. The processor can combine the image data from the front and back facing cameras for the verification of authorship of the image taken by the back facing camera. The memory can be any kind of memories capable of storing image data, such as non-volatile memory. The image data can be processed on the apparatus, or can be transferred to a computer for further processing. If processed on the apparatus, results of the processing can also be stored on the memory.

The front and back facing cameras can incorporate various digital camera technologies, such as blink detection, face recognition, face tracking, red-eye removal, red-eye reduction, smile detection, anti-shaking, dynamic lighting, smart de-noise, panorama making, object tracking, pet detection, and auto scene detection.

The front and back facing cameras can be stereo cameras that can capture three-dimensional images, and they can be configured to measure the speed of a moving object by taking images at predetermined times. With the aid of specific software, the processor can derive the speed based on the images taken at different times.

In some implementations, to verify that the image taken by the back facing camera is taken by a real person, one or more of the front facing cameras can conduct blink detection, face recognition, or take stereoscopic or moving images to improve the reliability of the verification.

The mode of display on the screen 160 can be selected. As further illustrated in FIG. 5 below, the image-taker can select to display only image from the front facing camera, only image from the back facing camera, or combined image. When displaying combined images, the image-taker can further select to display the combined image as picture-in-picture (both front-inside-back and back-inside-front, and the inside picture can be as small as a thumbnail image), picture-beside-picture, or picture with embedded information (in other words, image from back facing camera with embedded information derived from image from front facing camera, or vice versa).

The images stored on the memory can be transferred through an uploader to interne, other electronic device, instant film, or printer. The uploader can use a number of commonly deployed wired or wireless communications methods. For example, the uploading can be done via USB, PC Serial Port, infrared, FireWire, RJ45, IEEE 802.11 WiFi, or a telecommunication network such as 3G.

Figure 2:
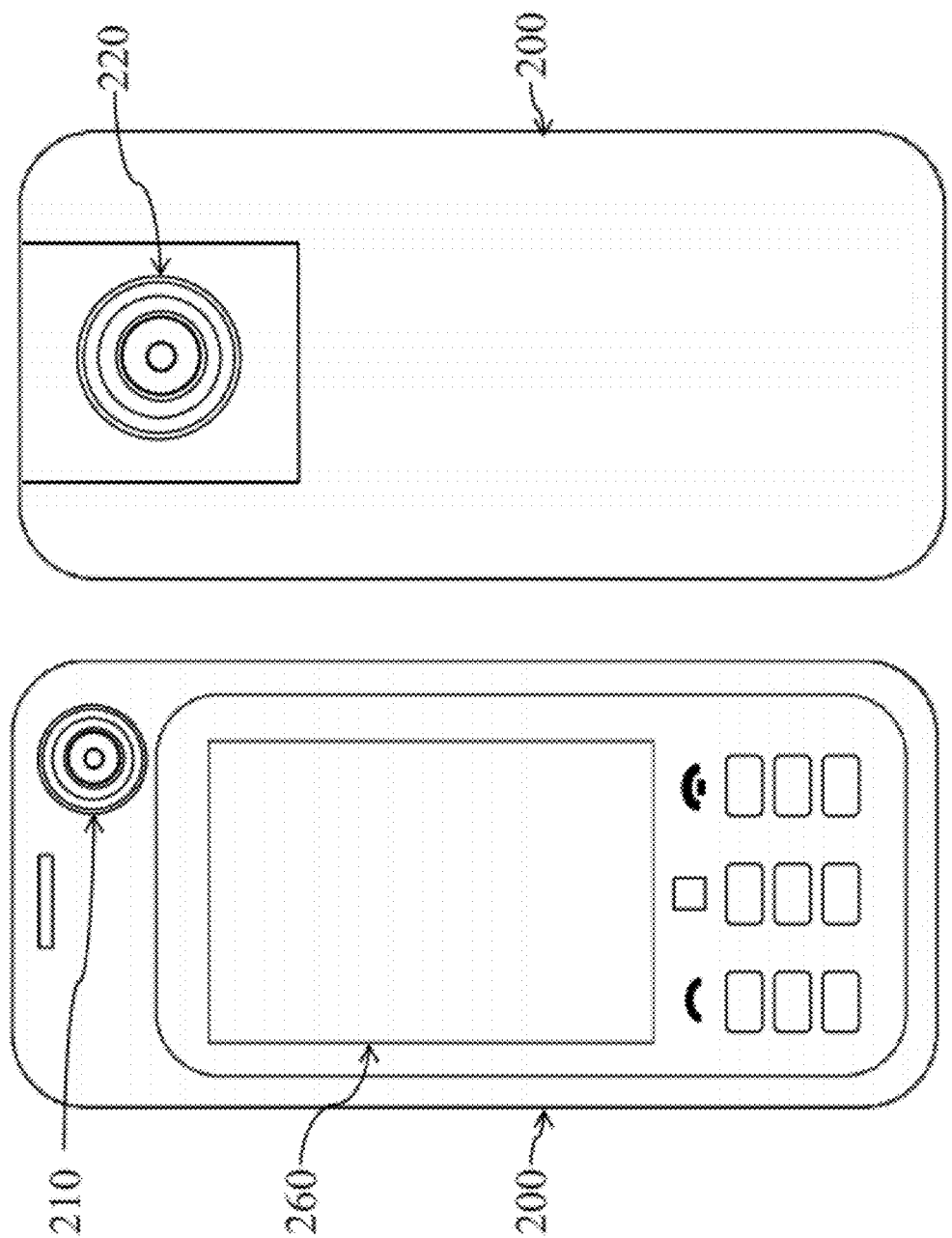
FIG. 2 is a diagram indicating a mobile phone equipped with front and back facing cameras.

FIG. 2 shows an implementation where the apparatus is a mobile phone 200 equipped with a front facing camera 210 and a back facing camera 220. The mobile phone 200 has a screen 260 for displaying images.

FIG. 3 shows an implementation where the apparatus is a digital camera 300 equipped with a front facing camera 310 and a back facing camera 320. The digital camera 300 has a screen 360 for displaying images.

FIG. 4 shows an implementation where the apparatus is a tablet computer 400 equipped with a front facing camera 410 and a back facing camera on the opposite side of the tablet computer (not shown). The tablet computer 400 has a screen 460 for displaying images and the combined image 450 is shown.

Figure 5:
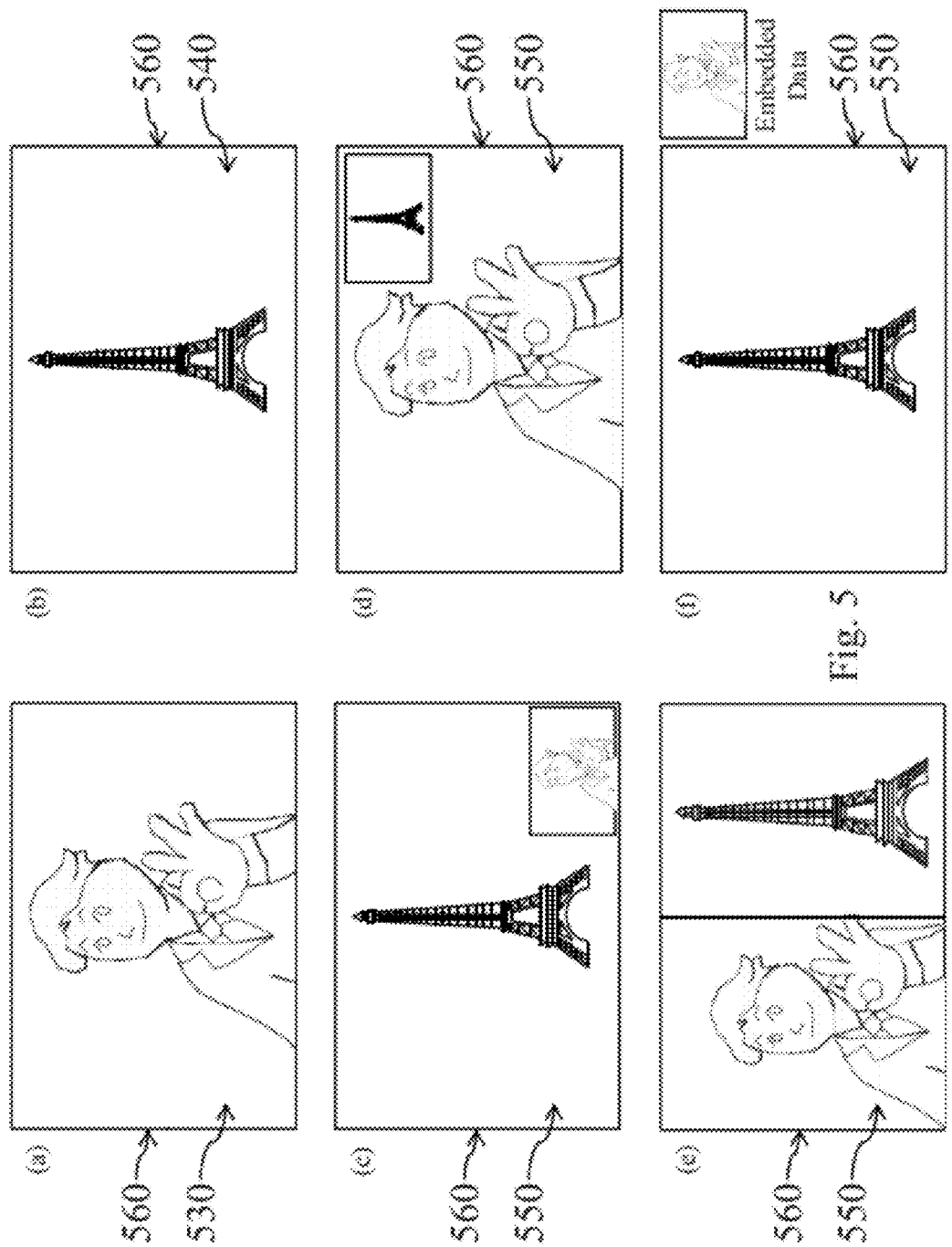
FIG. 5 is a diagram indicating the various ways the images taken by front and back facing cameras may be arranged on a display or in a combined image.

FIG. 5 shows examples of how images taken by the front and back facing cameras can be displayed on the screen 560 or in the combined image 550. The screen can display: (a) only the image of the image-taker 530; (b) only the image of the scene 540; (c) the combined image 550 where the image-taker is embedded as a smaller image within the bigger image of the scene; (d) the combined image 550 where the image of the scene is embedded as a smaller image within the bigger image of the image-taker; and (e) the combined image 550 where the image of the image-taker and the image of the scene are shown next to each other. FIG. 5(f) shows that not only can the image taken by the front facing camera appear as part of the combined image (such as FIG. 5(c)-(e)), it can also be combined with the image taken by the back facing camera as embedded data; it can also be combined as visible or invisible watermark, or digital signature (not shown).

The images taken by the front and back facing cameras can be still or moving images. In some implementations, the front and back facing cameras can be used to create two simultaneous images where the front camera images are used to capture images of the photographer for documentary purposes. Being simultaneous means both cameras capture images within a pre-defined and sufficiently small time period relative to human timescales. The two simultaneous images can be merged into a single stream, either in real-time or in post-processing, for the purpose of using the front facing camera images as a first-person documentary. For example, the combined stream may be a video of a scene taken by the back facing camera with a picture-in-picture video from the front facing camera where the front facing camera video is used as a "talking head" as narrator or commentator of the back facing camera video. The image-taker can have the ability to turn on and off the front facing camera in real-time to enable real-time inclusion and exclusion of front facing camera images in the separate or combined moving video images. The image-taker can also have the ability to switch in real-time between the front facing camera and the back facing camera, so that a single combined moving video image can be created by interleaving the content from front and back facing cameras under the image-taker's control. The image-taker can also have the ability to set a predetermined time period to switch between front and back facing camera automatically.

In some implementations, a combined still image with the back facing camera image containing the entire front facing camera image as a small inset (i.e., thumbnail) can be created, where the combined image contains both everything in the scene as well as the image-taker. Such an image is particularly useful in social gatherings, or to photograph one or more people, or in specific locations or settings, where the image-takers wants or needs to include themselves as part of the social gathering or to verify that they were present in that specific scene. Such an image may then be shared with others, including, for example, sharing on virtual online societies such as Facebook, clearly documenting that the image-taker was present and the author of the shared image. Similarly, moving video images from the front and back facing cameras can be used to document the inclusion of the image-taker in a social gathering or in a specific scene or setting.

In some implementations, the front and back facing cameras can be used to create a single moving or still image with a wide field of view. For example, a panoramic photograph requires rotational movement of a single camera to capture a cylindrical wide field of view. However, with front and back facing cameras operating simultaneously a combined image may be more easily created of views of up to 360 degrees.

Figure 6:
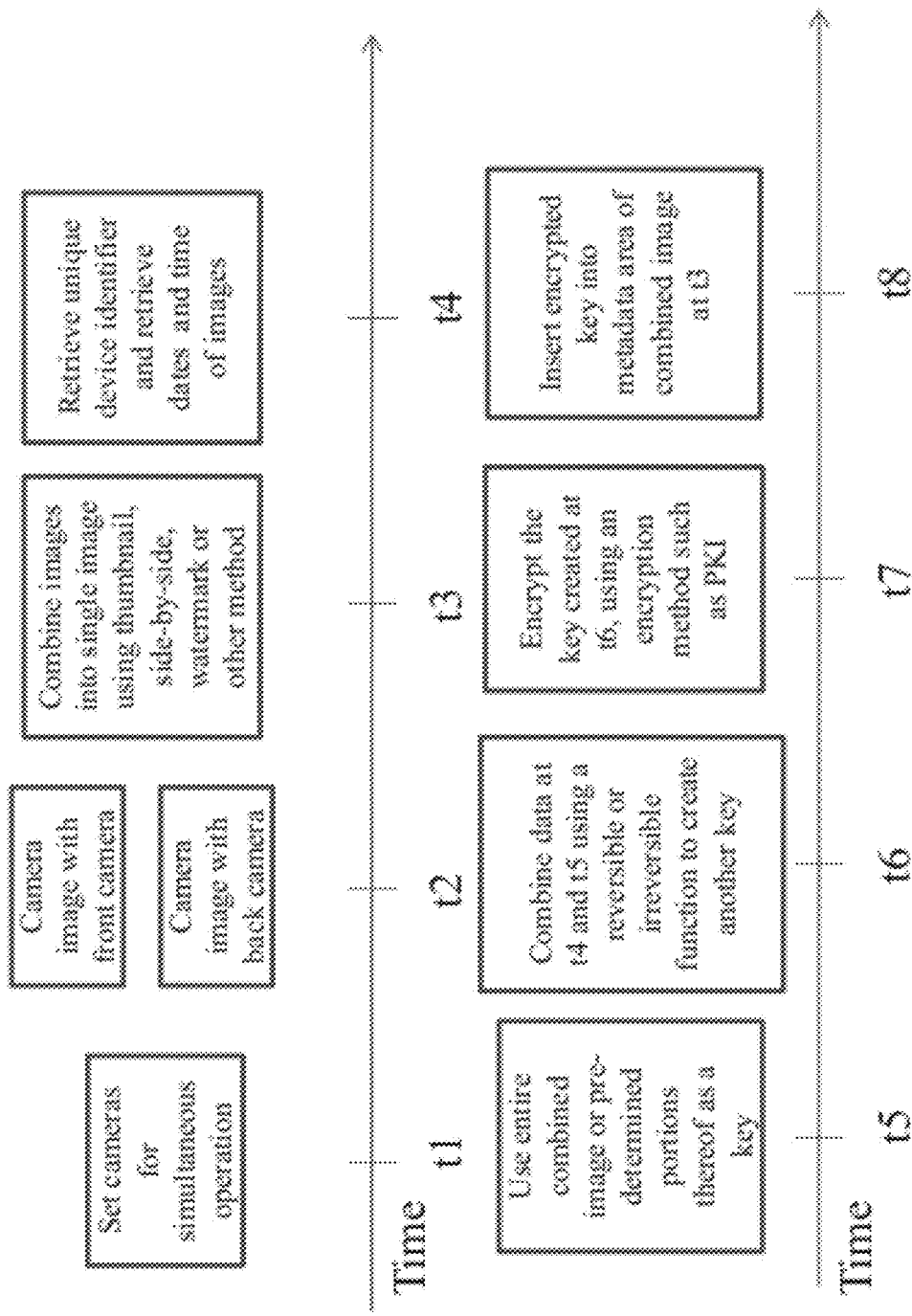
FIG. 6 is a diagram indicating an example of how to create verifiable photographer images using encryption.

FIG. 6 shows an example of how images taken by the front and back facing cameras can be used for authenticating authorship of the image taken by the back facing camera. In some implementations, using the controller, the front and back facing cameras are set to take images at the same time, based on which a combined image is then created. A unique identifier can be retrieved. This unique identifier can be a unique device identifier that uniquely identifies the apparatus, or it can be a unique photographer identifier that uniquely identifies the photographer, in which case the apparatus can allow the input of unique photographer information such as fingerprint, faceprint, voiceprint, iris recognition or other biometric identifying information, or document information such as social security number or passport number, or other uniquely identifiable information. A unique key can then be created by combining the unique identifier, the date and time of the images taken by the front and back facing cameras, and the combined image, using a reversible or irreversible function (such as addition). With the unique key, a unique encrypted key can be created by encrypting the unique key with an encryption algorithm. The encryption process can be symmetric or asymmetric. The encrypted key can be inserted into the metadata area of the combined image.

In some implementations, the encryption process may be asymmetric using, for example, a Public Key Infrastructure (PKI). The photographer can create a unique encrypted key using his private key, and provides a public key to anyone who wants to verify the authorship of an image taken by the photographer. The public key can be used for decryption of the encrypted key. If the decryption is successful, then a watermark, a thumbnail image of the photographer, or some other identifying information predetermined by the photographer will appear for human or machine visual comparison to verify the authenticity of the image. Alternatively and additionally, the unique encrypted key can be signed digitally using a digital certificate from a trusted agency, which could be the camera manufacturers.

OTHER EMBODIMENTS

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for a device to create a first-person documentary, the device comprising a first camera to capture an image-taker and a second camera to capture a scene, the method comprising:
   simultaneously taking live images with the first and the second cameras;
   generating a single stream in real-time by combining the live images taken by the first and the second cameras;
   providing an interface for the image-taker to enable real-time inclusion and exclusion of the live images taken by the first camera;
   when a first input for the real-time exclusion is received, generating the single stream by excluding the live images taken by the first camera from the single stream;
   when a second input for the real-time inclusion is received, generating the single stream by including the live images taken by the first camera in the single stream.

2. A method for taking and processing images, the method comprising:
   (a) configuring a front facing camera to take a first image;
   (b) configuring a back facing camera to take a second image;
   (c) taking the first and the second images with the front and the back facing cameras simultaneously;
   (d) creating a third image by combining the first and the second images;

(e) creating a unique key from a unique identifier, date and time information of the first image taken by the front facing camera, and the third image;
(f) encrypting the unique key to create a unique encrypted key; and
(g) storing the third image and the encrypted key.

3. A method according to claim 2, wherein storing the third image and the encrypted key comprises inserting the unique encrypted key as metadata in the third image.

\* \* \* \* \*